United States Patent
Alverani

[15] 3,695,037
[45] Oct. 3, 1972

[54] SHAFT MOUNTED FUEL CONTROL
[72] Inventor: Julius Alverani, Dearborn, Mich.
[73] Assignee: Teledyne Industries, Inc., Los Angeles, Calif.
[22] Filed: Sept. 8, 1970
[21] Appl. No.: 70,378

[52] U.S. Cl. ..............................60/39.28, 60/39.74 S
[51] Int. Cl. ................................................F02c 9/08
[58] Field of Search......................60/39.28, 39.74 S

[56] References Cited

UNITED STATES PATENTS

| 3,204,408 | 9/1965 | Vincent | 60/39.74 S |
| 3,301,269 | 1/1967 | Marwood | 60/39.28 X |
| 3,039,988 | 6/1962 | Trinkler | 60/39.28 |
| 3,289,403 | 12/1966 | Oprecht | 60/39.28 |
| 3,486,518 | 12/1969 | Howland | 137/81.5 |

*Primary Examiner*—Clarence R. Gordon
*Attorney*—Hauke, Gifford and Patalidis

[57] ABSTRACT

A fuel control system with a gas turbine engine that has a slinger-type burner nozzle. The fuel control system is attached to, but does not rotate with, the engine shaft and includes an electronically controlled valve member operated by a reversible motor upstream of the slinger nozzles for controlling the supply of fuel thereto. Fuel is delivered to the valve member from the fuel tank which is pressurized to compressor discharge pressure.

12 Claims, 3 Drawing Figures

PATENTED OCT 3 1972 3,695,037

INVENTOR
JULIUS ALBERANI

BY Hauke, Gifford & Patalidis
ATTORNEYS

SHAFT MOUNTED FUEL CONTROL

BACKGROUND OF THE INVENTION

I. Field of the Invention

The present invention relates to a fuel control system for a gas turbine engine and more particularly to a fuel control system for use with a gas turbine engine having slinger-type burner nozzles.

II. Description of the Prior Art

Heretofore, fuel control systems for small, high speed gas turbine engines have required an accessory gear box for their operation and for providing the turbine with overspeed protection. The necessity of a gear box increases the cost of the fuel control system, adds weight to the engine and limits the positions in which the fuel control can be mounted on the turbine engine.

Furthermore, many prior art fuel control systems require a fuel pump to provide a pressure head for the fuel, which adds expense and weight to the system.

SUMMARY OF THE INVENTION

The present invention provides a fuel control system which eliminates the need for an accessory gear box and a fuel pump, thus decreasing both the expense and weight of the system. The fuel control system of the present invention is for use with a gas turbine engine having slinger-type burner nozzles.

The fuel control system includes an electronically controlled valve member disposed upstream of the slinger nozzles for controlling the amount of fuel delivered thereto. The valve member is mechanically operated by a reversible motor, which is controlled by an electronic computer. The computer receives the power lever setting and the gas turbine engine shaft speed for controlling the reversible motor in response thereto. Optional inputs such as the compressor inlet pressure, the compressor discharge pressure, compressor inlet temperature and the turbine inlet temperature may be fed into the computer to control the valve member during turbine acceleration.

Fuel is supplied to the valve member by a fuel tank pressurized to compressor discharge pressure.

DESCRIPTION OF THE DRAWING

The description refers to the accompanying drawings in which like reference characters refer to like parts throughout the several views and in which.

DESCRIPTION OF THE PREFERRED EMBODIMENT

Figure 1:
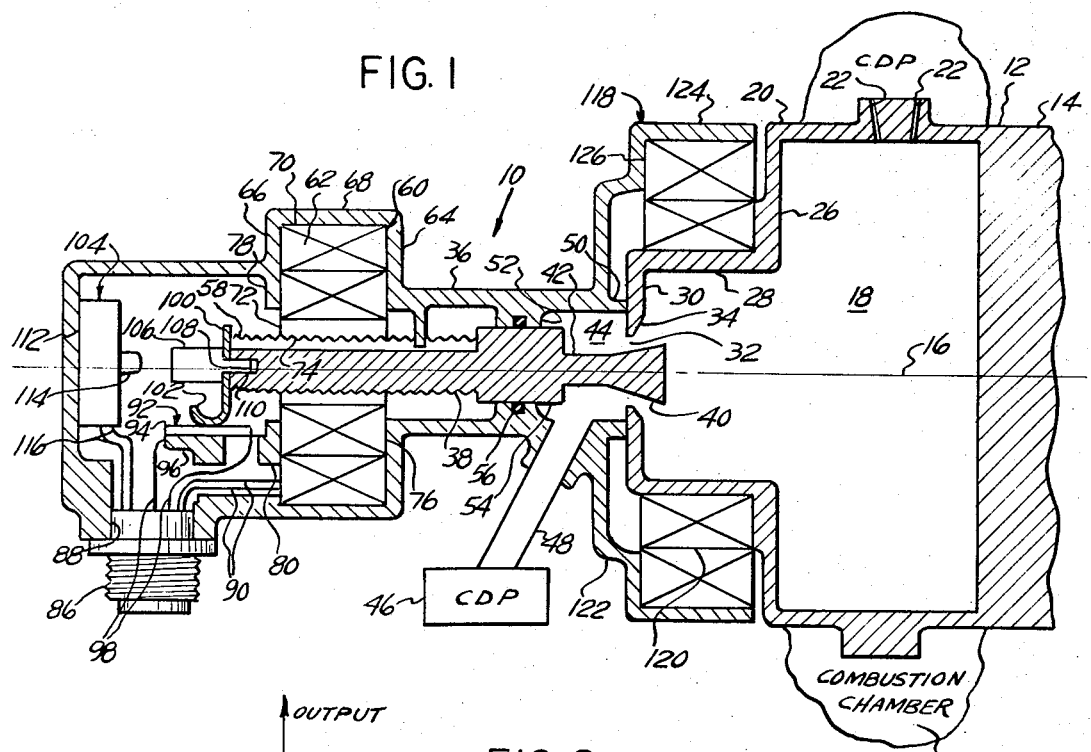
FIG. 1 is a partial cross-sectional side elevation view of the fuel control system of the present invention.

Referring to FIG. 1, the fuel control system, generally indicated at 10, is for use with a gas turbine engine having a shaft 12. The shaft 12 of the gas turbine engine shown in FIG. 1 includes a housing 14 which rotates about a centerline 16.

The housing 14 forms a central fuel chamber 18 which receives a metered supply of fuel from the fuel control system 10. The housing 14 includes a tubular portion 20 which surrounds a portion of the chamber 18 and has radially directed apertures 22 formed therein which sling fuel from the fuel chamber 18 into the gas turbine combustion chamber 24 during the rotation of the shaft 12. The tubular portion 20 has an inwardly extending radial flange 26 secured to its free end. A second tubular portion 28, which surrounds a part of the chamber 18, extends outwardly from the inner edge of the flange 26 and has an inwardly extending radial flange 30 secured to its free end. The flange 30 forms a central fuel inlet opening 32 for the chamber 18 and is chamfered at its inner edge 34 for reasons to be described.

The fuel control system 10 includes an elongated outer housing 36 which has one end disposed immediately adjacent the fuel inlet opening 32 and has an elongated valve member 38 disposed within the housing 36 with its longitudinal axis substantially aligned with the longitudinal axis of the housing. A cone-shaped member 40 forming one end of the valve member 38 is disposed within the fuel inlet opening 32, with its large end projecting into the fuel chamber 18 and its smaller diameter end fixed to a cylindrical portion 42 of the valve member 18. The cone-shaped member 40 may be moved farther into the chamber 18, enlarging the fuel inlet opening 32 to allow more fuel to flow into the chamber, or it may be pulled away from the chamber 18 thereby narrowing the fuel inlet opening 32 to decrease the fuel flow into the chamber.

A chamber 44 is formed in the housing 36 immediately upstream from the fuel opening 32 around a portion of the member 40 and the cylindrical portion 42 for receiving fuel from a pressurized fuel tank 46 via a conduit 48 connected therebetween. The fuel tank 46 is pressurized to compressor discharge pressure for supplying a pressure head to the fuel supply. An outwardly extending annular flange 50, forming a portion of the housing 36, engages the outer surface of the flange 30, forming a fluid tight seal therebetween, preventing the leakage of fuel from the chamber 44.

The housing 36 includes an inwardly extending annular flange 52 which forms a portion of one wall of the chamber 44. The valve member 38 has a cylindrically shaped enlarged portion 54 disposed within the opening formed by the flange 52 and having one end secured to the portion 42. The flange 52 carries an O-ring 56 therein for engaging the outer cylindrical surface of the portion 54 to form a fluid tight seal therebetween and prevent leakage of fluid from the chamber 44 into the rest of the housing 36. The flange 52 further supplies a sliding support for the valve member 38 such that it may be displaced along its longitudinal axis to vary the fuel inlet opening 32.

The valve member 38 further includes an elongated threaded member 58 having one end integral with the end of the portion 54 opposite the portion 42. The threaded member 58 is engaged by a reversible electric motor 60 disposed within the housing 36 for displacing the valve member 38 along its longitudinal axis to vary the fuel inlet opening 32.

The housing 36 includes an annular chamber 62 formed by an outwardly extending annular flange 64 formed therearound and a second outwardly extending annular flange 66 formed around a portion of the housing and connected together at their outer edges by a tubular portion 68 for housing members 70 which are a part of the electric motor 60. The members 70 are mounted to the housing 36 and may be either the windings or the permanent magnets of the motor 60.

The electric motor 60 includes a cylindrical member 72 disposed radially inwardly from the members 70 and has a threaded aperture 74 formed therethrough along its longitudinal axis engaging the threaded member 58. Members 76 are secured around the outer surface of the cylindrical member 72 and may be either windings or permanent magnets for the motor 60. Thus, one set of the members 70 and 76 would be the electric motor windings and the other set would be the permanent magnets. One side of the members 76 engage the inner surface of the flange 64, while the other side engages an inwardly extending annular flange 78 and an arcuate member 80 which is secured to the housing 36 for preventing axial movement of the member 72 and the members 76. Thus, when the electric motor 60 is energized, the members 76 rotate, causing the member 72 to rotate, displacing the valve member 38 along its longitudinal axis, opening or closing the fuel inlet opening 32.

Figure 2:
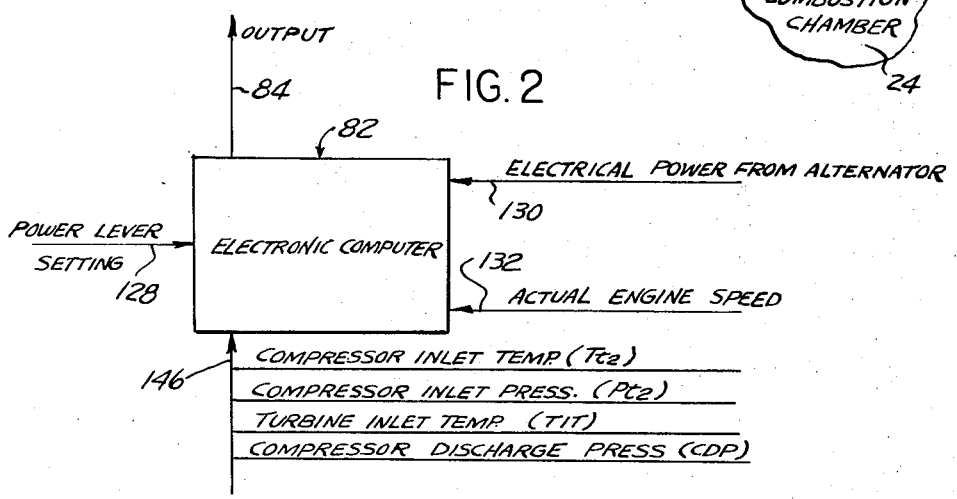
FIG. 2 is a schematic representation of the electronic computer which forms a part of the fuel control system shown in FIG. 1.

Referring to FIG. 2, the electric motor 60 is controlled by an electronic computer, generally indicated at 82. The output 84 of the electronic computer is mounted to the electric motor 60 by means of a threaded connection 86 (FIG. 1) secured in an aperture 88 formed in the housing 36 as by welding, bonding or the like. Further as can best be seen in FIG. 1, the threaded connection 86 includes a pair of wires 90 connected into members 70 for supplying electrical current thereto. It will be noted that the wires 90 could be connected to the member 76 by a pair of slip rings if it is desired to have the members 76 be the electric motor windings. A positive feedback unit 92, which is well known in the art, is disposed within the housing 36 and includes a plate 94 secured to the housing 36 as by a bracket 96. Wires 98 extending from the connector 86 are secured to opposite ends of the plate 94. A contact member 100 for the feedback unit 92 is preferably formed from spring steel and includes a straight portion secured to the free end of the threaded member 58 as by welding, bonding or the like and extends downwardly therefrom into a hooked end 102 which engages the top surface of the plate 94 for making electrical contact therewith. Thus, when an electrical signal is received by the motor 60 from the computer 82, the cylindrical member 72 is rotated axially, displacing the threaded member 58 and shifting the point of contact between the contact member 100 and the plate 94. When the threaded member 58 and the cone-shaped member 40 have reached the desired position, the feedback unit 92 prevents further rotation of the member 72.

A limit switch 104 is disposed within the housing 36 for setting the minimum fuel inlet opening 32 and includes an adjustment member 106 having a threaded stud 108 threaded into a threaded aperture 110 formed in the free end of the member 58 along its longitudinal axis. A switch 112 is secured within the housing 36 and includes a button 114 extending outwardly therefrom and in line with the member 106. A pair of wires 116 extend from the switch 112 to the connector 86 for connection to the computer 82 such that when the valve member 38 is moved to the left a sufficient distance for the member 106 to contact the button 114, the switch 112 prevents any current from being supplied to the electric motor 60, which will rotate the motor 60 in such a direction as to further close the fuel inlet opening 32. Thus, when the adjustment member 106 is in contact with the button 114, the computer 82 can only supply current to the reversible motor 60 such that rotation thereof will open the inlet opening 32.

Electrical power is supplied to the computer 82 and the electric motor 60 by an alternator 118 that includes members 120 secured around the outer surface of the tubular portion 28 to be rotated therewith. The members 120 may be either the permanent magnets or the windings of the alternator. The housing 36 includes a radially extending annular flange 122 formed adjacent the portion 28 and has a tubular portion 124 secured to the outer edge of the flange 122 and disposed radially outwardly from the members 120. Members 126 are secured to the inner surface of the tubular portion 124 radially outwardly from the members 120 and are either the permanent magnets or windings of the alternator. Thus, one set of the members 120 and 126 is the windings and the other set is the permanent magnets of the alternator. Thus, as the turbine shaft 12 rotates, members 120 are rotated, supplying electrical power to the computer 82 and the electric motor 60. Furthermore, the alternator 118 supplies the computer 82 with the actual shaft speed of the gas turbine engine.

In operation, the power lever is set by the operator, which sets the turbine engine steady state speed, and is fed into the computer 82 as indicated at 128 of FIG. 2. Electrical power and the actual gas turbine engine shaft speed from the alternator 118 are fed into the computer 82 as indicated at 130 and 132, respectively of FIG. 2.

Figure 3:
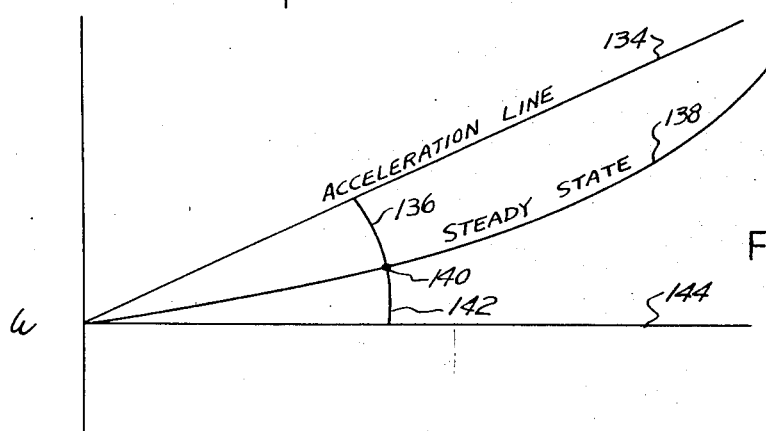
FIG. 3 is a graph of the fuel flow vs. turbine engine revolutions per minute.

Starting from an engine idle condition, when the power lever is pushed open and the new setting fed into the computer 82, the turbine engine accelerates along the acceleration line 134 shown in FIG. 3. When the speed set by the power lever setting 128 exceeds the actual turbine speed as fed into the computer at 132, the computer supplies electrical current to the motor 60, causing the rotation of the member 72 in the appropriate direction so as to displace the valve member 38 to the right, opening the fuel inlet opening 32. With the valve member 38 in the desired position, fuel from the fuel tank 46, pressurized to compressor discharge pressure, is conducted to the chamber 44 through conduit 48. Fuel from the chamber 44 flows through the inlet opening 32 in to the chamber 18 where it is slung through apertures 22 into the combustion chamber 24, which is also pressurized to compressor discharge pressure.

As the speed of the turbine approaches the steady state speed set by the power lever setting, the computer 82 supplies current to the motor 60, rotating the member 72 in the direction so as to displace the valve member 38 to the left, decreasing the inlet opening 32. The engine speed follows the downwardly sloping line 136 extending between the acceleration line 134 and the steady state line 138. Once the steady state line has been reached at point 140, which was set by the power lever setting, the speed of the turbine remains approximately constant.

Assuming the engine is operating at point 140 as shown in FIG. 3, when the power lever is returned to an engine idle condition, the computer supplies electrical power to the motor 60 to displace the valve member 38 to the left, decreasing the opening 32. As the opening 32 decreases, the engine following the downwardly slanting line 142 to the limit flow line 144, which is set by the engagement of the adjustment member 106 with the button 114, preventing the valve member from further closing the opening 32. The turbine engine then follows the limit flow line 144 back to the idle condition.

It will be noted that the compressor inlet temperature, compressor inlet pressure, turbine inlet temperature and the compressor discharge pressure may also be fed into the computer 82 as indicated at 146. These optional inputs would be fed into the computer 82 to control the slope of the acceleration line 134, as needed.

Although I have described but one preferred embodiment of my invention, it is to be understood that various changes and revision can be made therein without departing from the spirit of the invention or the scope of the appended claims.

I claim:

1. A fuel flow control unit for use with a gas turbine engine of the type having a compressor means, combustion means, a rotating shaft having a fuel chamber, a slinger burner nozzle carried by and rotatable with said shaft for directing fuel from said shaft fuel chamber into said combustion means, said fuel flow control unit comprising:
   a housing carried by but not rotatable with said shaft;
   a fuel metering opening communicating said shaft fuel chamber with said housing;
   a source of fuel connected to said housing and communicating with said shaft fuel chamber through said fuel metering opening;
   valve means movably mounted in said housing and cooperating with said fuel metering opening to vary the size of said opening as said valve means moves relative to said opening;
   electrically operated motor means carried in said housing and operatively coupled to said valve means for moving said valve means relative to said opening to control the rate of fuel flow therethrough into said fuel chamber;
   means for sensing the power lever setting and speed parameters of said gas turbine engine; and
   an electronic computer electrically connected to said motor means and receiving said sensed parameters for generating the electrical signal to actuate said motor means to selectively control the movement of said valve means as a function of said sensed parameters.

2. The fuel flow control means defined in claim 1, further comprising means for sensing the position of said valve means with respect to said fuel metering opening; and feedback means communicating said sensed positional information to said electronic computer.

3. The fuel flow control unit defined in claim 1, further comprising positional limit means operatively coupled to said electronic computer and actuated by abutment with said valve means after said valve means reaches a predetermined position with respect to said fuel metering opening such that said electronic computer prevents said motor means from moving said valve means beyond said sensed predetermined position.

4. The fuel flow control unit defined in claim 3 wherein said positional limit means further comprises means for selectively varying said predetermined position, said last mentioned means being carried by said valve means.

5. The fuel flow control unit defined in claim 1, further comprising a power generating means having a first member secured to said shaft and rotatable therewith; a second member rotatably movable with respect to said first member, said second member being carried by said housing for mounting said housing to said shaft and permitting said shaft to rotate as said housing is maintained in a non-rotary position with respect to said rotating shaft, and means electrically connecting said power generating means to said electronic computer.

6. The fuel flow control unit as defined in claim 1, wherein said source of fuel comprises a fuel reservoir for supplying fuel to said housing, said fuel reservoir being pressurized to compressor discharge pressure.

7. The fuel flow control unit as defined in claim 1, wherein said electronic computer is further responsive to the compressor inlet temperature, compressor inlet pressure, turbine inlet temperature and compressor discharge pressure to control the movement of said valve means during turbine engine acceleration.

8. The fuel flow control unit as defined in claim 1, wherein said valve means comprises an elongated member disposed within said housing and slidably mounted for movement along the axis of rotation of said shaft, said elongated member having one end projecting into said fuel metering opening, whereby movement of said elongated member toward and away from said opening varies the size of said fuel metering opening.

9. The fuel flow control unit as defined in claim 8, wherein a portion of said elongated member has threads formed therearound, and said motor means comprises a reversible electric motor disposed within said housing and connected to said electronic computer, said motor having a rotatably mounted member having a threaded bore formed therethrough and engaging said threaded portion of said elongated member, whereby rotation of said rotatably mounted member displaces said elongated member along said axis.

10. The fuel flow control unit as defined in claim 9, and including electrical power generating means electrically connected to both said electronic computer and said electrical motor for supplying electrical power thereto, said power generating means having a first set of members secured to said shaft adjacent said housing and a second set of members secured to said housing radially outwardly from said first set, whereby rotation of said shaft rotates said first set past said second set of members.

11. The fuel flow control unit as defined in claim 10, wherein said source of fuel comprises a fuel reservoir for supplying fuel to said housing, said fuel reservoir for supplying fuel to said housing, said fuel reservoir being pressurized to compressor discharge pressure.

12. A fuel flow control unit for use with a gas turbine engine of the type having a compressor means, a combustion means, a shaft having a fuel chamber, a slinger burner nozzle carried by and rotatable with said shaft for directing fuel from said fuel chamber into said combustion means, said fuel control unit comprising:

- a housing disposed adjacent the end of said rotating shaft;
- a power generating means having a first member secured to said shaft end and rotatable therewith and a second member rotatably mounted with respect to said first member, said second member carrying said housing such that said housing is stationary with respect to said rotating shaft;
- a fuel metering opening communicating said fuel chamber with said housing;
- a source of fuel connected to said housing and communicating with said fuel chamber through said fuel metering opening;
- valve means movably mounted in said housing and cooperating with said fuel metering opening to vary the size of said opening as said valve means moves relative to said opening;
- electrically operated motor means carried in said housing and operatively coupled to said valve means for moving said valve means relative to said opening to control the rate of fuel flow therethrough and into said fuel chamber;
- means for sensing the power lever setting and speed parameters of said gas turbine engine;
- an electronic computer electrically connected to said motor means and receiving said sensed parameters for generating an electrical signal to actuate said motor means to selectively control the movement of said valve means as a function of said sensed parameters;
- means sensing the position of said valve means with respect to said valve opening; and
- feedback means communicating said last mentioned sensed positional information to said electronic computer.

* * * * *

UNITED STATES PATENT OFFICE
CERTIFICATE OF CORRECTION

Patent No. 3,695,037          Dated October 3, 1972

Inventor(s) Julius Alberani

It is certified that error appears in the above-identified patent and that said Letters Patent are hereby corrected as shown below:

Inventor should be --Alberani-- .

In the Abstract
    Line 1, after "system" insert --for use-- .

Signed and sealed this 15th day of May 1973.

(SEAL)
Attest:

EDWARD M. FLETCHER, JR.           ROBERT GOTTSCHALK
Attesting Officer                   Commissioner of Patents

FORM PO-1050 (10-69)